(12) United States Patent
Jung et al.

(10) Patent No.: US 7,773,556 B2
(45) Date of Patent: Aug. 10, 2010

(54) METHOD AND APPARATUS FOR TRANSMITTING/RECEIVING MBMS TRANSPORT BLOCKS

(75) Inventors: Myung-Cheul Jung, Seoul (KR); Young-Dae Lee, HaNam-shi (KR); Sung-Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 1133 days.

(21) Appl. No.: 11/391,806

(22) Filed: Mar. 28, 2006

(65) Prior Publication Data

US 2006/0256807 A1 Nov. 16, 2006

(51) Int. Cl.
*H04W 4/00* (2009.01)
(52) U.S. Cl. .................................... 370/328; 370/331
(58) Field of Classification Search ................. 455/522, 455/436; 370/331, 312, 338–345, 350, 328
See application file for complete search history.

(56) References Cited

U.S. PATENT DOCUMENTS

| 7,177,658 B2 * | 2/2007 | Willenegger et al. ........ 455/522 |
| 2001/0014614 A1 | 8/2001 | Lautenschlager et al. |
| 2003/0207696 A1 | 11/2003 | Willenegger et al. |
| 2004/0008646 A1 * | 1/2004 | Park et al. .................... 370/331 |
| 2005/0111658 A1 * | 5/2005 | Ida et al. ........................ 380/28 |
| 2005/0190712 A1 * | 9/2005 | Lee et al. ..................... 370/312 |

FOREIGN PATENT DOCUMENTS

| CN | 1496041 | 5/2004 |
| EP | 1467586 A2 | 10/2004 |
| EP | 1509056 A2 | 2/2005 |
| EP | 1 372 350 B1 | 9/2006 |
| KR | 10-2003-0084516 | 11/2003 |
| KR | 1020030096090 | 12/2003 |
| RU | 2157598 C2 | 10/2000 |
| RU | 2198467 C2 | 2/2003 |
| RU | 2251224 C2 | 4/2005 |
| WO | 03096149 A2 | 11/2003 |
| WO | WO 03-096149 A2 | 11/2003 |
| WO | 2005011157 A1 | 2/2005 |

OTHER PUBLICATIONS

Russian Notice of Allowance: Decision On Grant Patent For Invention, Ref: 2412-14686RU/1008 of Jan. 19, 2009; Application No. 200713986/09(043564); filed on Mar. 28, 2006.

* cited by examiner

*Primary Examiner*—George Eng
*Assistant Examiner*—Michael Faragalla
(74) *Attorney, Agent, or Firm*—Lee, Hong, Degerman, Kang & Waimey

(57) ABSTRACT

An apparatus and method for transmitting/receiving multimedia broadcast/multicast service (MBMS) transport blocks is disclosed, whereby the MBMS transport blocks can be efficiently received by a user equipment (UE). The present invention enables a UE to determine information related to a transmission start timing point of an MBMS transport block, thereby increasing efficiency of soft combining.

14 Claims, 6 Drawing Sheets

METHOD AND APPARATUS FOR TRANSMITTING/RECEIVING MBMS TRANSPORT BLOCKS

CROSS-REFERENCE TO RELATED APPLICATIONS

Pursuant to 35 U.S.C. §119(a), this application claims the benefit of earlier filing date and right of priority to Korean Application No. P2005-0025644, filed on Mar. 28, 2005, the contents of which is hereby incorporated by reference herein in its entirety.

BACKGROUND OF THE INVENTION

1. Field of the Invention

The present invention relates to a method and apparatus for transmitting/receiving multimedia broadcast/multicast service (MBMS) transport blocks. Although the present invention is suitable for a wide scope of applications, it is particularly suitable for enabling a user equipment to receive the MBMS blocks more efficiently.

2. Description of the Related Art

FIG. 1 is a block diagram of a network structure of a universal mobile telecommunications system (UMTS). Referring to FIG. 1, the universal mobile telecommunications system (hereinafter, referred to as 'UMTS') includes a user equipment 1 (hereinafter, referred to as 'UE'), a UMTS terrestrial radio access network 2 (hereinafter, referred to as 'UTRAN') and a core network 3 (hereinafter, referred to as 'CN'). The UTRAN 2 includes at least one radio network sub-system 4 (hereinafter, referred to as 'RNS') and each RNS includes a radio network controller 5 (hereinafter, referred to as 'RNC') and at least one base station 6 (hereinafter, referred to as 'Node B') managed by the RNC. The Node B 6 includes at least one cell.

FIG. 2 is an architectural diagram of a radio interface protocol between a UE 1 and UTRAN 2. Referring to FIG. 2, the radio interface protocol horizontally includes a physical layer, a data link layer and a network layer and the radio interface protocol vertically includes a user plane for data information transfer and a control plane for signaling transfer. The protocol layers in FIG. 2 can be divided into L1 (first layer), L2 (second layer), and L3 (third layer) based on lower three layers of the open system interconnection (OSI) standard model widely known in the communications systems.

The physical layer as the first layer provides an information transfer service to an upper layer using physical channels. The physical layer is connected to a medium access control (MAC) layer above the physical layer via transport channels through which data are transferred between the medium access control layer and the physical layer. Data is transmitted between different physical layers, and more particularly, between the physical layer of a transmitting side and the physical layer of a receiving side via physical channels.

The medium access control (MAC) layer of the second layer provides services to a radio link control (hereinafter abbreviated RLC) layer above the MAC layer via logical channels. The RLC layer of the second layer supports reliable data transfer and is operative in segmentation and concatenation of RLC service data units (SDUs) sent down from an upper layer.

The RLC layer operates according to one of three modes; a transparent mode, an unacknowledged mode and an acknowledged mode. A major function of the RLC layer is an SDU discard function. A transmitting side RLC entity discards old RLC SDUs stored in the RLC entity in order to prevent an RLC buffer from being overloaded. The SDU discard function plays an important role in securing a quality of service (hereinafter 'QoS') of a radio bearer service provided by the RLC layer.

A condition for the transmitting side RLC entity to discard an SDU is the use of a timer or a retransmission count limitation. In the transparent or unacknowledged mode, only the timer is used. In the acknowledged mode, both of the timer and retransmission count limitation can be used.

When an RLC layer operates in transparent mode, no header information is added to an RLC SDU transferred from an upper layer and data is transmitted to a receiving side in RLC PDU format. It is decided to use segmentation and concatenation of RLC SDUs when establishing a radio bearer (hereinafter abbreviated 'RB').

A transmitting side transparent mode RLC entity and a receiving side transparent mode RLC entity are configured to transfer data unidirectionally. Therefore, when data transmission is bidirectional, the UE and UTRAN should each be equipped with the transmitting side transparent mode RLC entity and the receiving side transparent mode RLC entity.

When an RLC layer operates in unacknowledged mode, header information is added to an RLC SDU transferred from an upper layer and data is then transmitted to a receiving side in RLC PDU format. If transmission of an RLC PDU fails, retransmission is not supported. Therefore, even if data is lost or a problem occurs during transmission, the receiving side does not request retransmission but rather discards associated data.

In the unacknowledged mode, a transmitting side unacknowledged mode ELC entity transmits data to a receiving side unacknowledged mode RLC entity unidirectionally. Therefore, when data transmission is bidirectional, the UE and UTRAN should each be equipped with the transmitting side unacknowledged mode RLC entity and the receiving side unacknowledged mode RLC entity.

When an RLC layer operates in acknowledged mode, header information is added to an RLC SDU transferred from an upper layer and data is then transmitted to a receiving side in RLC PDU format. If transmission of an RLC PDU fails, retransmission is supported.

Specifically, a transmitting side RLC layer receives status information facilitating a determination of transmission success or failure with regard to a corresponding packet from a receiving side RLC layer and then retransmits an RLC PDU that needs to be retransmitted. In the acknowledged mode, response mode RLC entities, each of which includes a transmitting unit and a receiving unit, exist in both the UE and UTRAN, to enable bi-directional communication.

A radio resource control (RRC) layer located on the lowest part of the third layer is defined in the control plane only and controls the logical channels, the transport channels, and the physical channels with configuration, reconfiguration, and release of radio bearers (RBs). An RB is a service offered by the second layer for the data transfer between the UE 1 and the UTRAN 2. Generally, configuring an RB refers to defining the characteristics of protocol layers and channels necessary for providing a specific service and is to establish respective specific parameters and operational methods for them.

A multimedia broadcast/multicast service (hereinafter, referred to as 'MBMS') offers a streaming or background service to a plurality of UEs 1 using a downlink dedicated MBMS bearer service. An MBMS is provided during one session, and data for the MBMS is transmitted to the plurality of UEs 1 via the MBMS bearer service during an ongoing session only. A UE 1 performs activation first for receiving the MBMS to which the UE has subscribed and receives the activated services only.

The UTRAN 2 provides the MBMS bearer service to at least one UE 1 using radio bearers. The radio bearers (RBs) used by the UTRAN 2 include a point-to-point radio bearer and a point-to-multipoint radio bearer.

The point-to-point radio bearer is a bi-directional radio bearer and is configured by a logical channel DTCH (dedicated traffic channel), a transport channel DCH (dedicated channel), and a physical channel DPCH (dedicated physical channel) or a physical channel SCCPCH (secondary common control physical channel). The point-to-multipoint radio bearer is a unidirectional downlink radio bearer and is configured by a logical channel MTCH (MBMS traffic channel), a transport channel FACH (forward access channel), and a physical channel SCPCH. The logical channel MTCH is configured for each MBMS offered to one cell and is used for transmitting user-plane data of a specific MBMS to a plurality of UEs.

As illustrated in FIG. 3, a logical channel MCCH (MBMS control channel) in a conventional system is a point-to-multipoint downlink channel used in transmitting control information associated with the MBMS. The logical channel MCCH is mapped to the transport channel FACH (forward access channel), while the transport channel FACH is mapped to the physical channel SCCPCH (secondary common control physical channel). A cell has only one MCCH.

The UTRAN 2 providing MBMS services transmits MCCH information through the MCCH channel to at least one UE 1. The MCCH information includes notification messages, specifically RRC messages related to the MBMS. For example, the MCCH information may include messages indicating MBMS service information, messages indicating point-to-multipoint radio bearer information or access information indicating that RRC connection for the MBMS is needed.

FIG. 4 is a diagram illustrating how MCCH information is transmitted in a conventional method. FIG. 5 illustrates a conventional method for providing an MBMS.

As illustrated in FIG. 4, the UTRAN 2 providing an MBMS service transmits the MCCH information to a plurality of UEs 1 via the MCCH channel. The MCCH information is periodically transmitted according to a modification period and a repetition period.

The MCCH information is categorized into critical information and non-critical information. The non-critical information can be freely modified each modification period or each repetition period. However, the critical information can be modified only each modification period.

Specifically, the critical information is repeated one time each repetition period. However, the modified critical information can be transmitted only at a start point of the modification period.

If at least two neighbor cells transmit the same information related to an MBMS via an MTCH, a UE receives the MTCH transmitted from the cells by soft combining in order to increase its reception sensitivity. In order to facilitate soft combining, transport blocks from the cells in the same time interval should be identical to each other and a UTRAN should transmit transport blocks for one transport channel only for any given transmission time interval (hereinafter abbreviated TTI).

One transport block is delivered over one transport channel for one TTI. If there are transport blocks to be transmitted, a transmitting side MAC delivers at least one transport block to a physical layer according to a TTI unit. A transmitting side physical layer encodes the transport blocks received from the MAC for transmission to a receiving side physical layer.

In order, to allow the receiving side physical layer to decode the encoded data correctly, as illustrated in FIG. 3, the transmitting side transmits transport format (hereinafter abbreviated 'TF') information to the receiving side together with the encoded data. After receiving the TF information from the transmitting side, the receiving side physical layer decodes the received data using the TF in order to reconfigure the transport blocks. The reconfigured transport blocks are transferred to a receiving side MAC according to a TTI unit.

The TF information includes various attributes related to one transport channel. Attributes of the TF information can be classified as semi-static and dynamic. Semi-static attributes are TF information that can be changed slowly by an RRC message. Dynamic attributes are TF information that can be changed fast by TTI or radio frame unit.

A dynamic attribute is transferred via a transport format combination indicator (hereinafter abbreviated 'TFCI'). The transmitting side transmits the TFCI to the receiving side via a control field of a physical channel.

Typical dynamic attributes of the TF information are transport block size and transport block set size. The transport block size is defined as a set of transport blocks in a TTI.

One transport block is defined as one MAC PDU (protocol data unit), which includes one MAC SDU (service data unit) and one MAC header. At least one transport block can be delivered during one TTI.

The sizes of the transport blocks transmitted for the same TTI are equal. Therefore, a size of the transport block set is a multiple of the size of the transport block.

An RRC establishes a set of size values of transportable transport blocks for one transport channel. A set of the transport blocks of one transport channel is called a transport format set (TFS).

At least two transport channels are mapped to one physical channel for transmission. The RRC establishes a set of combinations of the transport blocks of the transport channels that can be simultaneously transmitted for the same transport section via the corresponding physical channel. A set of the combinations (transport format combinations) of the transport blocks of at least two transport channels mapped to one physical channel is called a TFCS (transport format combination set).

An RNC transmits TFCS information for the physical channel to the transmitting and receiving sides. In order to transmit TFCS information, the RNC transforms the TFCS information into calculated transport format combination (hereinafter abbreviated CTFC) information for transmission to the transmitting and receiving sides rather than directly transmitting the TFCS information.

A connection fame number (herein abbreviated 'CFN') is a frame counter used for second layer (Layer2)/transport channel synchronization between a UE and a UTRAN. A CFN value is associated with one TBS and is transmitted via a MAC-L1 SAP.

The CFN is used for common frame reference in Layer2. For example, the CFN can be used for synchronized transport channel reconfiguration.

In MBMS transmission, a UE can increase its reception sensitivity by receiving the same MBMS transport blocks from several neighbor cells providing the same MBMS. In general, transmission of an MBMS transport block can start from a CFN corresponding to a multiplication of the number of frames necessary for transmission of one TTI.

Therefore, if several different MBMS transport blocks are transmitted by being mapped to one channel, transmission of MBMS transport blocks may not be possible within a required time to enable soft combining. In order to solve this problem, MBMS service transmission is delayed, thereby wasting channel resources.

Therefore, it is necessary to initiate transmission of MBMS transport blocks from different timing points as well as the CFN corresponding to the multiplication of frames required for the transmission of one TTI. However, in the conventional method, a UE is unable to determine information related to a transmission start timing point of an MBMS transport block, thereby reducing efficiency of soft combining.

Therefore, there is a need for a method and apparatus for transmitting/receiving multimedia broadcast/multicast service (MBMS) transport blocks that enables a UE to determine information related to a transmission start timing point of an MBMS transport block, thereby increasing efficiency of soft combining. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention is directed to an apparatus and method for transmitting/receiving multimedia broadcast/multicast service (MBMS) transport blocks that substantially obviates one or more problems due to limitations and disadvantages of conventional methods. An object of the present invention is to provide an apparatus and method for transmitting/receiving multimedia broadcast/multicast service (MBMS) transport blocks, whereby the MBMS transport blocks can be efficiently received by a user equipment (UE).

In one aspect of the present invention, a method for receiving a point-to-multipoint service in a mobile terminal is provided. The method includes receiving a first point-to-multipoint service transport block from a current cell, receiving control information from the current cell, the control information including a temporal offset, receiving a second point-to-multipoint service transport block from a neighboring cell using the temporal offset while receiving the first point-to-multipoint service transport block from the current cell and combining the first and second point-to-multipoint service transport blocks.

It is contemplated that the control information including the temporal offset is received from a service radio network controller. Preferably, the temporal offset includes one of a frame offset and a time offset.

It is contemplated that the control information including the temporal offset is received via a radio resource control (RRC) signaling message. Preferably, the control information including the temporal offset is received via one of a point-to-multipoint service control channel and a broadcast control channel.

It is contemplated that the point-to-multipoint service includes a multimedia broadcast/multicast service. It is further contemplated that the temporal offset is associated with a connection frame number (CFN) for transmitting a transport block.

It is contemplated that a connection frame number for receiving the second point-to-multipoint service transport block is determined by using the temporal offset. It is further contemplated that the control information including the temporal offset is received via a common range bearer information message, a current cell point-to-multipoint range bearer information message and/or a neighboring cell point-to-multipoint range bearer information message.

In another aspect of the present invention, a method for providing a point-to-multipoint service to at least one mobile terminal is provided. The method includes providing a first point-to-multipoint service transport block from a first cell in which the at least one mobile terminal is currently located, providing control information from the first cell, the control information including a temporal offset and providing a second point-to-multipoint service transport block from a second cell using the temporal offset while providing the first point-to-multipoint service transport block from the first cell.

It is contemplated that the control information includes the temporal offset is provided from a service radio network controller. Preferably, the temporal offset includes one of a frame offset and a time offset.

It is contemplated that the control information including the temporal offset is provided via a radio resource control (RRC) signaling message. Preferably, the control information including the temporal offset is provided via one of a point-to-multipoint service control channel and a broadcast control channel.

It is contemplated that the point-to-multipoint service includes a multimedia broadcast/multicast service. It is further contemplated that the temporal offset is associated with a connection frame number (CFN) for transmitting a transport block.

It is contemplated that connection frame number for providing the second point-to-multipoint service transport block is determined by using the temporal offset. It is further contemplated that the control information including the temporal offset is provided via at least one of a common range bearer information message, a current cell point-to-multipoint range bearer information message and a neighboring cell point-to-multipoint range bearer information message.

In another aspect of the present invention, a mobile communication terminal for receiving a point-to-multipoint service in a mobile terminal is provided. The mobile terminal includes an antenna unit adapted to receive RF signals containing a first point-to-multipoint service transport block from a current cell, a second point-to-multipoint service transport block from a neighboring cell and control information from the current cell, the control information including a temporal offset, an RF unit adapted to process the RF signals received by the antenna, a keypad for inputting information from a user, a storage unit adapted to store the first point-to-multipoint service transport block, the second point-to-multipoint service transport block and the control information, a display adapted to convey information to the user and a processing unit adapted to process the second point-to-multipoint service transport block according to the temporal offset while processing the first point-to-multipoint service transport block and to combine the first and second point-to-multipoint service transport blocks.

It is contemplated that the temporal offset includes either a frame offset or a time offset. Preferably, the processing unit is further adapted to extract the control information including the temporal offset from a radio resource control (RRC) signaling message.

It is contemplated that the processing unit is further adapted to process the control information including the temporal offset via either a point-to-multipoint service control channel or a broadcast control channel. It is further contemplated that the point-to-multipoint service includes a multimedia broadcast/multicast service. Preferably, the temporal offset is associated with a connection frame number (CFN) for transmitting a transport block.

It is contemplated that the processing unit is further adapted to determine a connection frame number for receiving the second point-to-multipoint service transport block by using the temporal offset. Preferably, the processing unit is further adapted to extract the control information including the temporal offset from a common range bearer information message, a current cell point-to-multipoint range bearer information message and/or a neighboring cell point-to-multipoint range bearer information message.

In another aspect of the present invention, a network for providing a point-to-multipoint service to at least one mobile terminal is provided. The network includes one or more transmitters adapted to transmit signals containing a first point-to-multipoint service transport block, a second point-to-multipoint service transport block and control information to the at least one mobile communication terminal, the first point-to-multipoint service transport block and control information provided from a first cell in which the at least one mobile terminal is currently located and the second point-to-multipoint service transport block provided from a second cell, a receiver adapted to receive signals from the at least one mobile communication terminal and a controller adapted to include a temporal offset in the control information and to control the transmitters to transmit the second point-to-multipoint service transport block according to the temporal offset while transmitting the first point-to-multipoint service transport block.

It is contemplated that the one or more transmitters are adapted to transmit signals containing a first point-to-multipoint service transport block is located in a service radio network controller. Preferably, the controller is further adapted to include the temporal offset including one of a frame offset and a time offset.

It is contemplated that the controller is further adapted to include the control information in a radio resource control (RRC) signaling message. Preferably, the controller is further adapted to provide the control information via a point-to-multipoint service control channel or a broadcast control channel.

It is contemplated that the point-to-multipoint service includes a multimedia broadcast/multicast service. Preferably, the controller is further adapted to include a temporal offset associated with a connection frame number (CFN) for transmitting a transport block.

It is contemplated that the controller is further adapted to determine a connection frame number for transmitting the second point-to-multipoint service transport block by using the temporal offset. Preferably, the controller is further adapted to include the control information a common range bearer information message, a current cell point-to-multipoint range bearer information message and/or a neighboring cell point-to-multipoint range bearer information message.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an apparatus and method for transmitting/receiving multimedia broadcast/multicast service (MBMS) transport blocks, whereby the MBMS transport blocks can be efficiently received by a user equipment (UE). Although the present invention is illustrated with respect to a mobile communication device, it is contemplated that the present invention may be utilized anytime it is desired to transmit and receive transport blocks efficiently.

Reference will now be made in detail to the preferred embodiments of the present invention, examples of which are illustrated in the accompanying drawings. Wherever possible, the same reference numbers will be used throughout the drawings to refer to the same or like parts.

Figure 1:
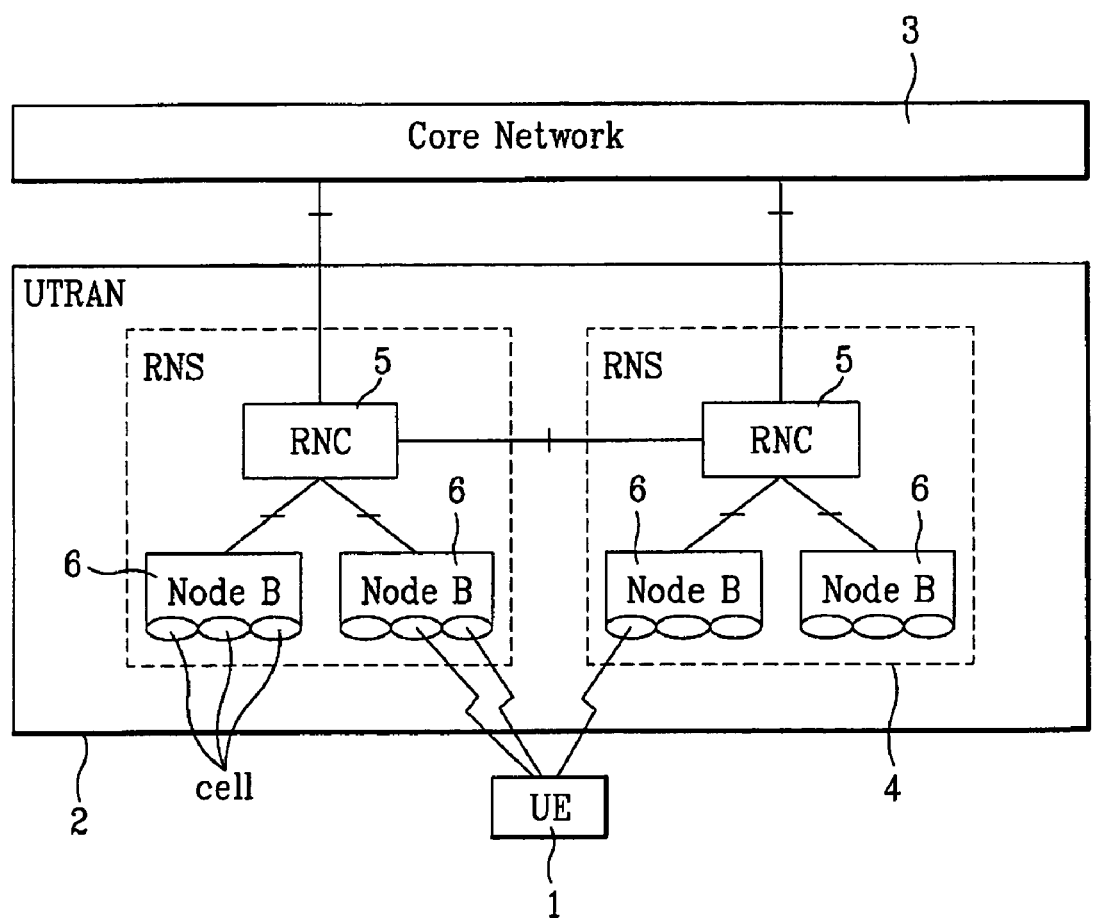
FIG. 1 is a block diagram of a network structure of a general UMTS.
Figure 2:
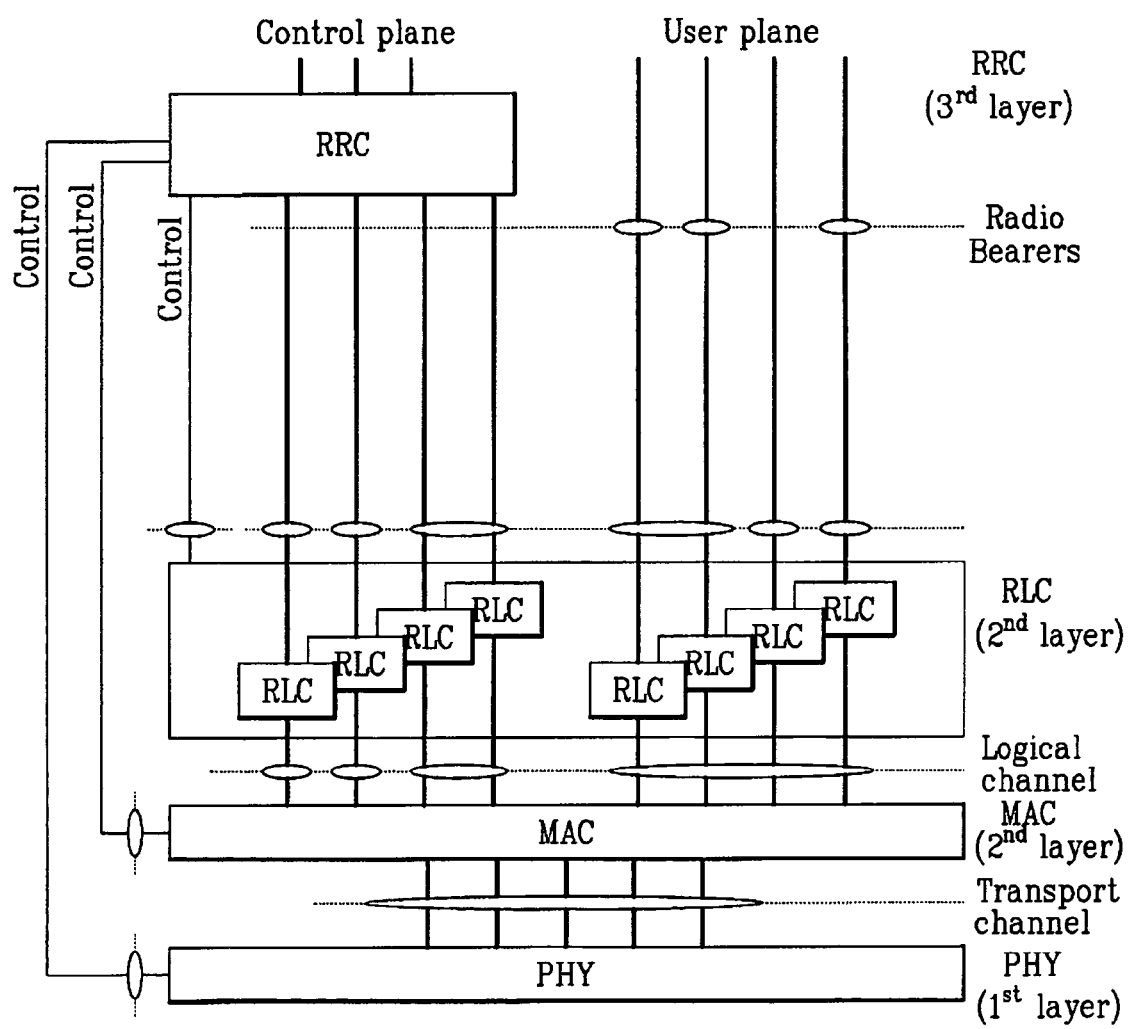
FIG. 2 is a diagram of a structure of a radio interface protocol between a UE and a UTRAN.
Figure 3:
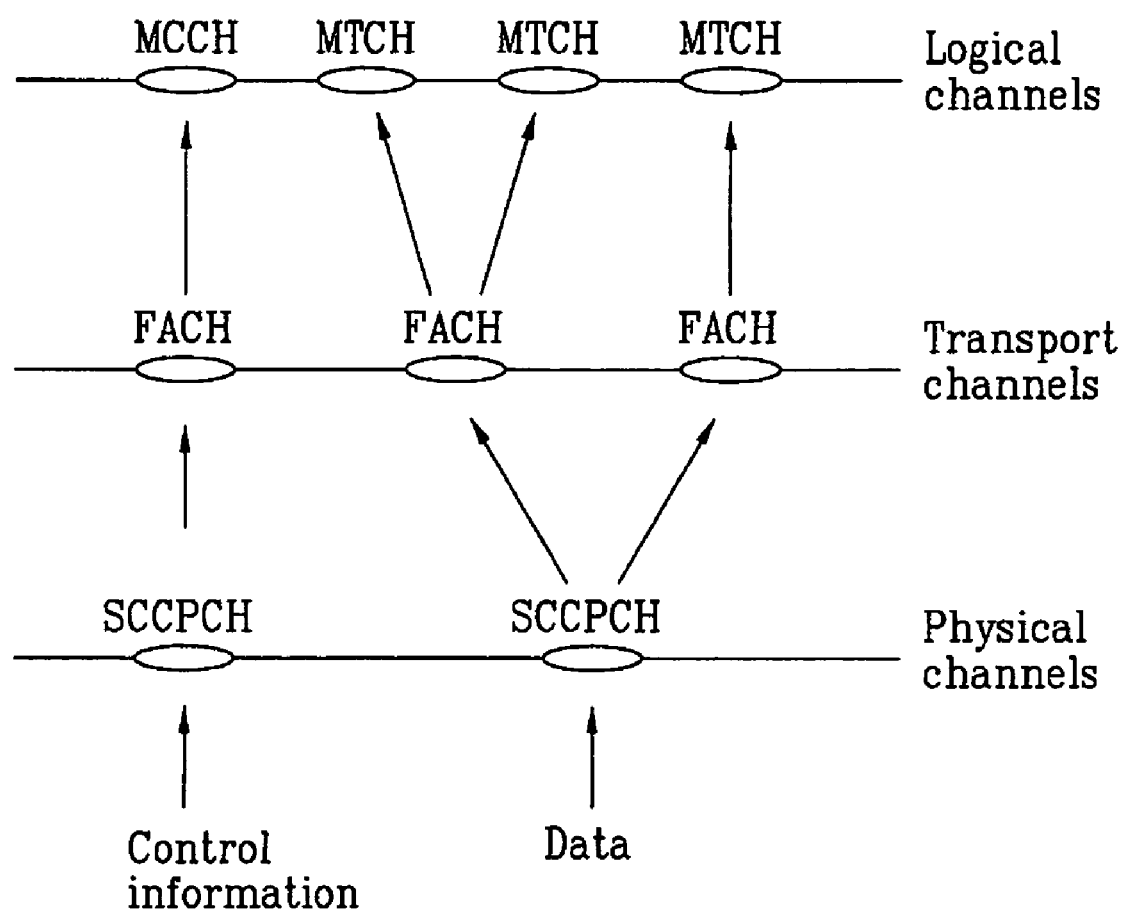
FIG. 3 is a diagram illustrating a channel configuration for an MBMS in a UE.
Figure 4:
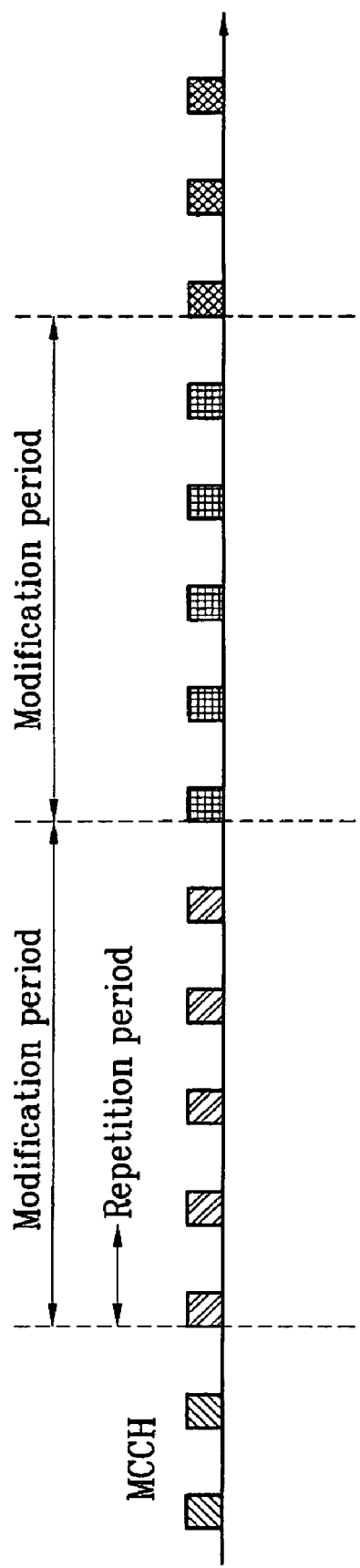
FIG. 4 is a diagram illustrating transmission scheme of MCCH information in a conventional system.
Figure 5:
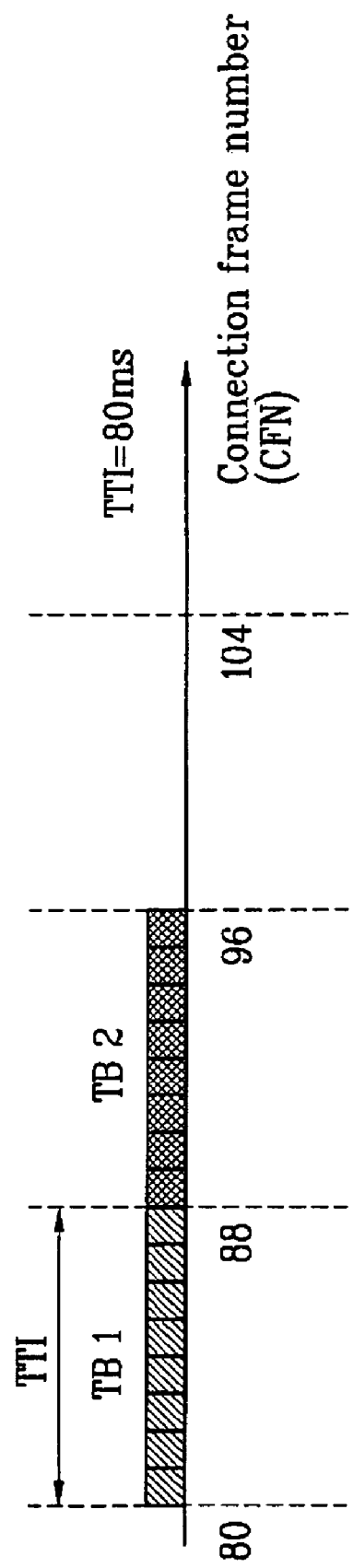
FIG. 5 illustrates a transmission scheme of MBMS transport blocks according to one embodiment of the present invention.

FIG. 5 is a diagram illustrating transmission of an MBMS transport block. As illustrated in FIG. 5, transmission of the transport block can start from a time corresponding to a connection frame number (CFN) that corresponds to a multiple of the number of frames transmitted during one transmit time interval (TTI) such that division by the number of frames yields a remainder of '0'. Specifically, the transport block transmission can be initiated at a timing point corresponding to a CFN that satisfies Formula 1.

$$\text{CFN mod F}=0 \qquad \text{[Formula 1]}$$

In Formula 1, 'F' is the number of frames required for one TTI transmission. As illustrated in FIG. 5, since the number of frames necessary for one TTI is '8', the CFN available for a transmission timing point of transport block is 80, 88, 96 or 104.

To perform soft combining in a physical layer of a receiving side, the same transport block should be received from a neighboring cell within a time of (1 TTI+1 slot). However, if TTI has to be simultaneously used for different services over one channel, transmission block reception from a neighboring cell is normally impossible within a soft combining window, thereby making soft combining impossible.

In order to overcome this problem, it is necessary to initiate transport block transmission at a timing point not corresponding to a CFN corresponding to a multiple of the number of frames required for one TTF transmission such that division by the number of frames yields a remainder of '0'. Specifically, a transport block must be transmitted at a timing point that does not satisfy Formula 1.

In order to accomplish this, information about a transmission timing point of an MBMS transport block can be determined as a value that has a uniform time interval from a CFN that satisfies Formula 1, such as a frame offset. The frame offset information can be delivered to a Node B and a UE to indicate a timing point from which transmission of a corresponding transport block begins. Alternatively, transmission timing point information can be determined as a new CFN indicating a transmission start point of an MBMS transport block irrespective of a CFN that satisfies Formula 1.

Figure 6:
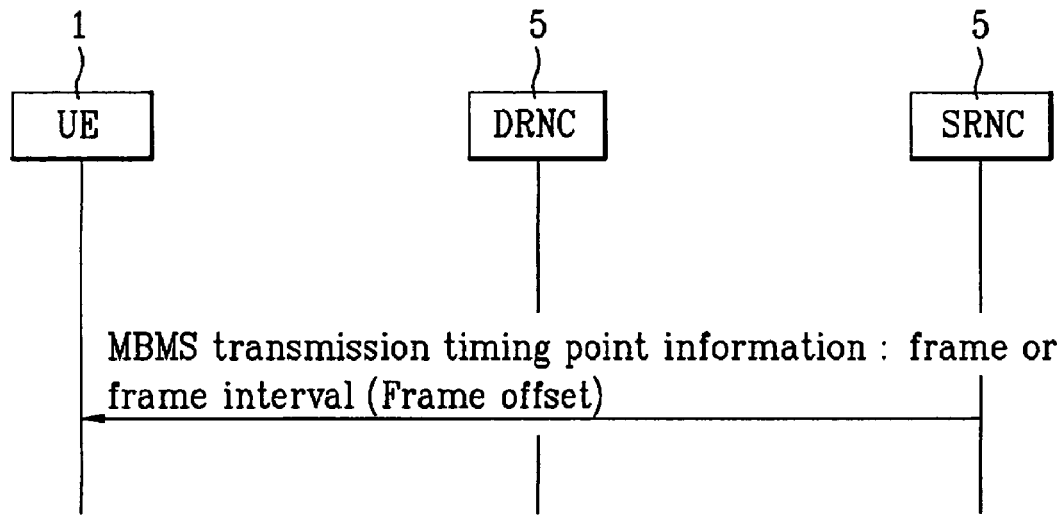
FIG. 6 illustrates a method of transmitting transmission timing point information related to transmitting MBMS transport blocks according to the present invention.

FIG. 6 illustrates a method of transmitting transmission timing point information for an MBMS transport block. As illustrated in FIG. 6, transmission timing point information related to an MBMS transport block is transmitted to a UE from an RNC.

A frame offset is one example of the transmission timing point information related to an MBMS transport block. For instance, with reference to FIG. 5, the frame offset may be information indicating that transmission of a transport block begins at a timing point with a certain delay from CFN 80, 88 or 96. Specifically, if the frame offset value is '2', transmission of a transport block can be initiated at a timing point corresponding to a value of CFN 82, 90 or 98.

A UE can correctly obtain a transmission timing point of an MBMS transport block using the corresponding transmission timing point information. The transmission timing point information of the transport block may differ in each cell. Specifically, a UE can receive different types of transmission timing point information from several cells.

The UE can deliver the information received regarding the MBMS transmission timing point to a physical layer. The physical layer of the UE can correctly determine a reception timing of an SCCPCH, which is an MBMS physical layer transport channel corresponding to a transport block transmitted from a UTRAN, using this information.

The MBMS service transmission timing may be a new CFN generated specifically for the MBMS. The UE receives the new CFN and determines an accurate transmission timing point of the transport block. The determined transmission timing point can be provided to the physical layer in order to determine an accurate timing point of an SCCPCH carrying a corresponding transport block.

The transmission timing point of an MBMS transport block can be transmitted to the UE via an RRC signaling message. Furthermore, the transmission timing point of the MBMS transport block can be transmitted to the UE via an MCCH or BCCH or can be included in a MBMS COMMON RB INFORMATION message, a MBMS Current Cell p-t-m rb Information message or an MBMS Neighboring Cell p-t-m rb Information message.

The embodiments of the present invention are illustrated with respect to mobile communications. However, the technical features of the present invention are also applicable to wireless communication systems, such as a PDA (personal digital assistant) or a notebook computer equipped with a wireless communication function. Terms used in describing the present invention are not limited to a wireless communication system, such as UMTS. The present invention is applicable to wireless communication systems using different wireless interfaces and physical layers such as TDMA, CDMA and FDMA.

The technical features of the present invention can be implemented with software, firmware, hardware or combinations of the software, firmware and/or hardware. Specifically, the contents of the present invention may be implemented with hardware using a code, circuit chip and hardware logic such as ASIC or with code in a storage medium readable by a computer such as a hard disc, a floppy disc or a tape or in a optical storage, ROM or RAM using a computer programming language. Code stored in a computer readable medium may be accessible by a processor and can be executed.

Code implementing contents of the present invention may be accessible via a transport medium or via a file server on a network. A device implemented with the code may be configured to include a wire transport medium such as a network transport line, a wireless transport medium, a signal transfer, a radio signal or an infrared signal.

Figure 7:
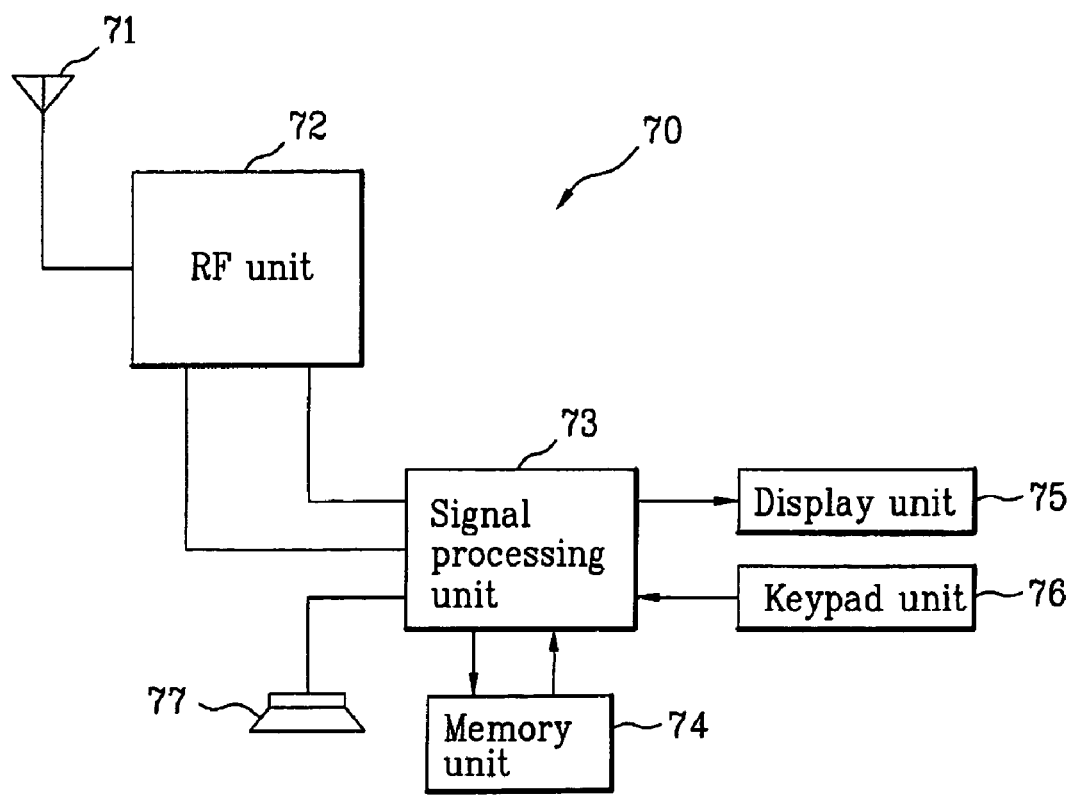
FIG. 7 is a block diagram of a mobile communication terminal according to one embodiment of the present invention

FIG. 7 illustrates a block diagram of a mobile communication terminal 70 according to one embodiment of the present invention. As illustrated in FIG. 7, the mobile communication terminal 70 includes an antenna unit 71, an RF (radio frequency) unit 72, a signal processing unit 73 and a memory unit 74. The signal processing unit 73 includes a processing unit such as a microprocessor and a digital processor. The mobile communication terminal further includes a display unit 75 displaying specific information on a screen, a keypad unit 76 receiving a signal from a user and a speaker unit 77 outputting a sound signal.

The mobile communication terminal 70 receives transmission timing point information related to an MBMS transport block and at least one transport block from at least one base station using the antenna unit 71 and the RF unit 72. The signal processing unit 73 decodes the at least one received MBMS transport block corresponding transmission timing point using the information related to the MBMS transport block.

The present invention enables a UE to accurately determine a transmission timing point of an MBMS transport block, thereby enabling the UE to receive the MBMS efficiently.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modificaitons, and variations will be apparent to those skilled in the art. In the claims, means-plus-function clauses are intended to cover the structure described herein as performing the recited function and not only structural equivalents but also equivalent structures.

What is claimed is:

1. A method of receiving a point-to-multipoint service in a mobile terminal, the method comprising:

receiving, in the mobile terminal, control information comprising a temporal offset, the control information being received from a current cell via a current cell point-to-multipoint radio bearer information message or from a neighboring cell via a neighboring cell point-to-multipoint radio bearer information message;

receiving, in the mobile terminal from the current cell, a first point-to-multipoint service transport block;

calculating, in the mobile terminal, a connection frame number using the received temporal offset, wherein the temporal offset comprises one of a frame offset and a time offset;

receiving, in the mobile terminal from the neighboring cell, a second point-to-multipoint service transport block using the calculated connection frame number, wherein the receiving of the second point-to-multipoint service transport block occurs while the first point-to-multipoint service transport block is received; and combining, in the mobile terminal, the first and second point-to-multipoint service transport blocks, wherein the point-to-multipoint service comprises a multimedia broadcast/multicast service.

2. The method of claim 1, wherein the control information comprising the temporal offset is received from a service radio network controller.

3. The method of claim 1, wherein the control information comprising the temporal offset is received via a radio resource control (RRC) signaling message.

4. The method of claim 1, wherein the control information comprising the temporal offset is received via one of a point-to-multipoint service control channel and a broadcast control channel.

5. A mobile terminal, comprising:

an antenna unit adapted to receive RF signals comprising a first point-to-multipoint service transport block from a current cell, a second point-to-multipoint service transport block from a neighboring cell, and control information, wherein the control information is received from the current cell via a current cell point-to-multipoint radio bearer information message or from the neighboring cell via a neighboring cell point-to-multipoint radio bearer information message, the control information comprising a temporal offset, wherein the temporal offset comprises one of a frame offset and a time offset;

an RF unit adapted to process the RF signals received by the antenna;

a keypad for inputting information from a user;

a storage unit adapted to store the first point-to-multipoint service transport block, the second point-to-multipoint service transport block, and the control information;

a display adapted to convey information to the user; and a processing unit adapted to calculate a connection frame number using the temporal offset, process the first point-to-multipoint service transport block, process the second point-to-multipoint service transport block according to the calculated connection frame number, and combine the first and second point-to-multipoint service transport blocks, wherein the processing of the first point-to-multipoint service transport block occurs while the second point-to-multipoint service transport block is processed, wherein the point-to-multipoint service comprises a multimedia broadcast/multicast service.

6. The mobile terminal of claim 5, wherein the processing unit is further adapted to extract the control information comprising the temporal offset from a radio resource control (RRC) signaling message.

7. The mobile terminal of claim 5, wherein the processing unit is further adapted to process the control information comprising the temporal offset via one of a point-to-multipoint service control channel and a broadcast control channel.

8. A method of receiving a point-to-multipoint service in a mobile terminal, the method comprising:

receiving, in the mobile terminal from a current cell, a first point-to-multipoint service transport block;

receiving, in the mobile terminal from the current cell, first control information via a current cell point-to-multipoint radio bearer information message, the first control information comprising a first temporal offset;

receiving, in the mobile terminal from a neighboring cell, second control information via a neighboring cell point-to-multipoint radio bearer information message, the second control information comprising a second temporal offset;

calculating, in the mobile terminal, a connection frame number using at least one of the first temporal offset or the second temporal offset, wherein the temporal offset comprises one of a frame offset and a time offset;

receiving, in the mobile terminal from the neighboring cell, a second point-to-multipoint service transport block using the calculated connection frame number, wherein the receiving of the second point-to-multipoint service transport block occurs while the first point-to-multipoint service transport block is received; and combining, in the mobile terminal, the first and second point-to-multipoint service transport blocks, wherein the point-to-multipoint service comprises a multimedia broadcast/multicast service.

9. The method of claim 8, wherein the first and second control information respectively comprising the first and second temporal offsets are received from a service radio network controller.

10. The method of claim 8, wherein the first and second control information respectively comprising the first and second temporal offsets are received via a radio resource control (RRC) signaling message.

11. The method of claim 8, wherein the first and second control information respectively comprising the first and second temporal offsets are received via a point-to-multipoint service control channel or a broadcast control channel.

12. The method of claim 1, wherein the first and second point-to-multipoint service transport blocks are received through a secondary common control physical channel (SC-CPCH) mapped to a multimedia broadcast/multicast service traffic channel (MTCH).

13. The mobile terminal of claim 5, wherein the first and second point-to-multipoint service transport blocks are received through a secondary common control physical channel (SCCPCH) mapped to a multimedia broadcast/multicast service traffic channel (MTCH).

14. The method of claim 8, wherein the first and second point-to-multipoint service transport blocks are received through a secondary common control physical channel (SC-CPCH) mapped to a multimedia broadcast/multicast service traffic channel (MTCH).

* * * * *